(12) United States Patent
Connor et al.

(10) Patent No.: US 9,371,181 B2
(45) Date of Patent: Jun. 21, 2016

(54) SECURE ACCUMULATION/DISPOSAL BIN

(75) Inventors: Pat Connor, Kitchener (CA); Paul Goyette, Penetanguishene (CA); Gord Bennett, Midland (CA)

(73) Assignee: Jake, Connor & Crew, Inc., Kitchener, Ontario (CA)

( * ) Notice: Subject to any disclaimer, the term of this patent is extended or adjusted under 35 U.S.C. 154(b) by 1822 days.

(21) Appl. No.: 11/697,223

(22) Filed: Apr. 5, 2007

(65) Prior Publication Data
US 2008/0246239 A1    Oct. 9, 2008

(51) Int. Cl.
*B65D 43/14*    (2006.01)
*B65F 1/14*    (2006.01)
*B65F 1/12*    (2006.01)

(52) U.S. Cl.
CPC ............. *B65F 1/1468* (2013.01); *B65F 1/122* (2013.01); *B65F 1/1607* (2013.01); *B65F 1/1615* (2013.01); *B65F 1/1646* (2013.01); *B65F 2220/12* (2013.01); *B65F 2240/1562* (2013.01); *Y02W 30/64* (2015.05)

(58) Field of Classification Search
USPC ............. 220/908, 908.3, 210, 810; 280/47.26
See application file for complete search history.

(56) References Cited

U.S. PATENT DOCUMENTS

| 613,795 | A | 11/1898 | Costello |
|---|---|---|---|
| D226,328 | S | 2/1973 | Patton et al. |
| D257,550 | S | 11/1980 | Holcroft |
| 4,315,592 | A | 2/1982 | Smith |
| 4,749,101 | A | 6/1988 | Durkan, Jr. |
| 4,836,394 | A | 6/1989 | Glomski |
| 4,917,257 | A | 4/1990 | Edelhoff |
| 4,930,649 | A | 6/1990 | Moser |
| D313,491 | S | 1/1991 | Edelhoff et al. |
| 5,071,024 | A | 12/1991 | Delmerico et al. |
| 5,088,750 | A | 2/1992 | Beese et al. |

(Continued)

FOREIGN PATENT DOCUMENTS

| CA | 1268153 A | 4/1990 |
|---|---|---|
| CA | 1269051 A | 5/1990 |

(Continued)

OTHER PUBLICATIONS

"American National Standard Equipment Technology and Operations for Wastes and Recyclable Materials: Waste Containers—Compatibility Dimensions", American National Standard: ANSI Z245. 60-2006, 2006, (WASTEC) Waste Eqthpment Technology Association, Washington, DC.

(Continued)

*Primary Examiner* — Jeffrey Allen
(74) *Attorney, Agent, or Firm* — Bereskin & Parr LLP/S.E.N.C.R.L., S.r.l.

(57) ABSTRACT

An accumulation/disposal bin includes a container body with an upper opening. The lid pivots about the forward edge of the opening, allowing a lock to be formed on the rear edge of the lid. Edge mounted wheels may further be located proximate the rear bottom of the container, diagonally across from the hinge. The bin may further include a lifting slot on the rear wall. A handle may be formed proximate the upper opening on the rear the bin. The lid may comprise a downwardly sloped ramp extending from an opening in a horizontal plane to beneath a portion of the lid that at least partially covers this horizontal plane. The ramp and the covering portion of the lid define first and second slots each in a generally vertical plane that may prevent access to the body.

24 Claims, 16 Drawing Sheets

(56) References Cited

U.S. PATENT DOCUMENTS

| | | | |
|---|---|---|---|
| D328,170 S | 7/1992 | Juergens | |
| 5,141,124 A | 8/1992 | Smith et al. | |
| 5,150,806 A | 9/1992 | Glomski | |
| 5,165,564 A | 11/1992 | Prout et al. | |
| 5,167,351 A | 12/1992 | Prout et al. | |
| 5,193,708 A | 3/1993 | Prout et al. | |
| D335,564 S | 5/1993 | Delmerico | |
| 5,217,135 A | 6/1993 | Smith et al. | |
| 5,217,136 A | 6/1993 | Sanden, Jr. | |
| 5,224,744 A | 7/1993 | Michelutti | |
| 5,251,779 A | 10/1993 | Schmidt | |
| 5,261,562 A | 11/1993 | Prout et al. | |
| D345,837 S | 4/1994 | Bean | |
| D347,095 S | 5/1994 | Apps et al. | |
| 5,323,923 A | 6/1994 | Schauer | |
| 5,356,027 A | 10/1994 | Craft et al. | |
| D355,741 S | 2/1995 | Craft et al. | |
| D360,512 S | 7/1995 | McKenna | |
| D365,428 S | 12/1995 | Prout et al. | |
| D365,901 S | 1/1996 | Kowalski et al. | |
| 5,538,158 A | 7/1996 | Prout et al. | |
| 5,547,104 A | 8/1996 | Parker | |
| 5,582,322 A | 12/1996 | Prout et al. | |
| D381,163 S | 7/1997 | Lee | |
| 5,647,502 A | 7/1997 | Marsh | |
| D388,577 S | 12/1997 | Rehrig et al. | |
| 5,738,395 A | 4/1998 | Probst | |
| 5,743,542 A | 4/1998 | Mast et al. | |
| 5,776,405 A | 7/1998 | Prout et al. | |
| D398,120 S | 9/1998 | Rehrig et al. | |
| D400,332 S | 10/1998 | Sanden, Jr. | |
| 5,816,591 A | 10/1998 | Parker et al. | |
| D410,125 S | 5/1999 | Rehrig et al. | |
| D429,398 S | 8/2000 | Wysocki | |
| D445,228 S | 7/2001 | Apps et al. | |
| 6,276,557 B1 | 8/2001 | Wysocki | |
| 6,280,001 B1 | 8/2001 | Parker et al. | |
| 6,283,909 B1 * | 9/2001 | Sharp | 588/249.5 |
| 6,290,093 B1 | 9/2001 | Obriot et al. | |
| 6,328,320 B1 | 12/2001 | Walski et al. | |
| D461,291 S | 8/2002 | Kaminski et al. | |
| D470,989 S | 2/2003 | Tuduri | |
| D471,336 S | 3/2003 | Tuduri | |
| D474,317 S | 5/2003 | Tuduri | |
| D474,319 S | 5/2003 | Tuduri | |
| D477,899 S | 7/2003 | Tuduri | |
| D478,197 S | 8/2003 | Raghunathan | |
| 6,733,053 B2 | 5/2004 | Hodge et al. | |
| D491,328 S | 6/2004 | Aiken et al. | |
| D491,329 S | 6/2004 | Taylor | |
| D491,708 S | 6/2004 | Taylor | |
| 6,758,366 B2 | 7/2004 | Bourgund et al. | |
| 6,880,717 B1 | 4/2005 | O'Conor | |
| 6,902,080 B2 | 6/2005 | Busch | |
| D509,335 S | 9/2005 | Tuduri | |
| 6,968,972 B2 | 11/2005 | Taylor | |
| 7,086,557 B2 | 8/2006 | Miller et al. | |
| 7,100,791 B2 | 9/2006 | Berger | |
| 7,114,631 B2 | 10/2006 | Aiken et al. | |
| 7,121,564 B2 | 10/2006 | Hassell | |
| D532,173 S | 11/2006 | Aiken et al. | |
| D535,448 S | 1/2007 | Kilduff et al. | |
| 7,172,088 B2 | 2/2007 | McDade et al. | |
| 2003/0213808 A1 * | 11/2003 | Berger | 220/832 |
| 2004/0108666 A1 | 6/2004 | Lauer | |
| 2006/0081642 A1 | 4/2006 | Taylor | |
| 2006/0191949 A1 | 8/2006 | Miller et al. | |
| 2006/0232029 A1 | 10/2006 | Parker et al. | |
| 2006/0273097 A1 | 12/2006 | Taylor | |

FOREIGN PATENT DOCUMENTS

| | | |
|---|---|---|
| CA | 2008581 | 7/1990 |
| CA | 2038705 A1 | 9/1991 |
| CA | 1296691 C | 3/1992 |
| CA | 1298561 C | 4/1992 |
| CA | 2058195 A1 | 6/1992 |
| CA | 2061276 A1 | 8/1992 |
| CA | 1315754 C | 4/1993 |
| CA | 1316124 C | 4/1993 |
| CA | 1327765 C | 3/1994 |
| CA | 2147719 A1 | 10/1995 |
| CA | 2109868 C | 1/1999 |
| CA | 2273901 A1 | 2/2000 |
| CA | 2133310 C | 4/2000 |
| CA | 2321454 A1 | 3/2001 |
| CA | 2313847 A1 | 5/2001 |
| CA | 2324855 A1 | 5/2001 |
| CA | 2305909 A1 | 10/2001 |
| CA | 2351056 A1 | 12/2001 |
| CA | 2413005 A1 | 1/2002 |
| CA | 2372465 A1 | 8/2003 |
| CA | 2418583 A1 | 8/2003 |
| CA | 2080206 C | 12/2003 |
| CA | 2524776 A1 | 1/2004 |
| CA | 2507873 A1 | 6/2004 |
| CA | 2524895 A1 | 12/2004 |
| CA | 2213422 C | 10/2007 |
| GB | 2243868 | 11/1991 |
| WO | WO 98/49073 A1 | 11/1908 |
| WO | WO 93/08104 A2 | 4/1993 |
| WO | WO 94/01349 A1 | 1/1994 |
| WO | WO 96/15918 A1 | 5/1996 |
| WO | WO 97/32799 A1 | 9/1997 |
| WO | WO 97/38924 A1 | 10/1997 |
| WO | WO 97/46468 A1 | 12/1997 |
| WO | WO 98/49074 A1 | 11/1998 |
| WO | WO 99/11525 A1 | 3/1999 |
| WO | WO 99/26867 A1 | 6/1999 |
| WO | WO 00/09410 A1 | 2/2000 |
| WO | WO 00/44648 A1 | 8/2000 |
| WO | WO 00/53515 A1 | 9/2000 |
| WO | WO 01/60719 A1 | 8/2001 |
| WO | WO 02/26596 A1 | 4/2002 |
| WO | WO 03/050017 A1 | 6/2003 |
| WO | WO 2004/013021 A1 | 2/2004 |
| WO | WO 2004/094268 A1 | 11/2004 |
| WO | WO 2006/007644 A1 | 1/2006 |

OTHER PUBLICATIONS

"American National Standard Equipment Technology and Operations for Wastes and Recyclable Materials; Waste Containers—Safety Requirements", American National Standard: ANSI Z245.30-2006, 2006. (WASTEC) Waste Equipment Technology Association, Washington, DC.

Canadian Industrial Design Registration No. 97480, "Rollout Cart Lid", registered on Sep. 30, 2002, to Cascade Engineering, Inc.

Canadian Industrial Design Registration No. 99947, "Refuse Container", registered on Jul. 30, 2003, to Norseman Plastics Limited.

Canadian Industrial Design Registration No. 104750, "Waste Container", registered on Nov. 17, 2005, to Rehrig Pacific Company, Inc.

International Search Report for International Patent Application No. PCT/CA2008/000613, Filed Apr. 4, 2008, Form PCT/ISA/210, ISA/CA, Gatineau, Quebec.

Great Britain Patent Office Communication issued Feb. 18, 2011 in relation to Great Britain Patent Application GB0919103.2, filed Apr. 4, 2008.

Office Action for Canadian Application No. 2,682,837, filed Apr. 4, 2008, Canadian Intellectual Property Office, Office Action issued Aug. 31, 2011.

* cited by examiner

SECURE ACCUMULATION/DISPOSAL BIN

FIELD OF THE INVENTION

The present invention relates generally to refuse collection bins, and more particularly to an accumulation/disposal bin that may be suitable for safely collecting paper destined for secure disposal. One embodiment is particularly well suited for the collection of paper to be shredded from an office environment.

BACKGROUND OF THE INVENTION

Garbage and recycling bins formed of plastic are generally known. Bins used in the collection of paper to be shredded or recycled, however, are typically formed of more rigid materials such as wood or particle board. Typically, the choice of materials is based on a desire to keep such bins aesthetically pleasing and generally tamperproof.

Unfortunately, wood or particle board bins are cumbersome to access. They typically cannot be moved once full, and are thus usually emptied in situ. Moreover, the bins are costly to manufacture, deliver, and store, and are often not particularly pleasing to the eye.

As such, there remains a need for accumulation/disposal bins suitable for safely collecting paper and the like destined for secure disposal that are inexpensively produced, yet aesthetically pleasing, and moderately secure.

SUMMARY OF THE INVENTION

In accordance with an aspect of the present invention, an accumulation/disposal bin includes a container body with an upper opening. A lid covers the upper opening. The lid is mounted on a hinge on the forward wall of the body, to pivot about an axis proximate the upper opening. The lid thus pivots about the forward edge of the opening, allowing a lock to be formed on the rear edge of the lid. Edge mounted wheels may further be located proximate the rear bottom of the container, diagonally across from the hinge. The bin may further include a lifting slot on the rear wall. In this way, lock, wheels, and lifting slot may be generally hidden when the bin is in-situ, providing a relatively clean outward appearance. The rear of the bin may further include a lifting skirt. As well, a handle may be formed proximate the upper opening on the rear the bin The lid may comprise a downwardly sloped ramp extending from an opening in a horizontal plane to beneath a portion of the lid that at least partially covers this horizontal plane. The ramp and the covering portion of the lid define first and second slots each in a generally vertical plane. The second slot provides an entrance to an interior of the container body.

Conveniently, the covering portion and ramp, and the first and second generally vertical slots may be spaced to prevent access by hand through the slots in the container body.

In accordance with an aspect of the present invention, there is provided a bin. The bin comprises a container body defining an opening, a generally planar lid closing the opening. The lid comprises a downwardly sloped ramp extending from an opening in a horizontal plane to beneath a portion of the lid at least partially covering the horizontal plane. The ramp and the portion of the lid defining first and second slots each in a generally vertical plane, the second slot providing an entrance to an interior of the container body.

In accordance with another aspect of the present invention, there is provided a bin. The bin comprises a container body having upstanding front, rear and side walls extending from a base. The walls define an upper opening to a container, a lid covering the upper opening, a hinge on the front wall, proximate the upper opening, mounting the lid to the container body to pivot about an axis proximate the front wall of the container body; and two opposing wheels, mounted for rotation about an axis that is fixed relative to the body. One of the opposing wheels extends from each of the side walls proximate the rear bottom of the container.

In accordance with yet another aspect of the present invention, there is provided a bin. The bin comprises a container body defining an opening, a generally planar lid closing the opening. The lid comprises a downwardly sloped ramp extending from an opening in a horizontal plane to beneath a portion of the lid at least partially covering the horizontal plane. The ramp and the portion of the lid define first and second slots each in a generally vertical plane, the second slot providing an entrance to an interior of the container body. The first and second slots and the ramp and the portion of the lid spaced to allow insertion of sheets of paper into the container, while preventing insertion of a human hand into the container through the slot.

In accordance with yet another aspect of the present invention, there is provided a bin. The bin comprises a container body having upstanding front, rear and side walls extending from a base. The walls define an upper opening to a container; a lid covering the upper opening; a hinge on the front wall, proximate the upper opening, mounting the lid to the container body to pivot about an axis proximate said front wall of the container body. The rear wall comprises an indentation extending from the base, and defining a lifting slot; two opposing wheels to support the base; a handle formed proximate the upper opening on the rear of the bin, generally opposite the hinge.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
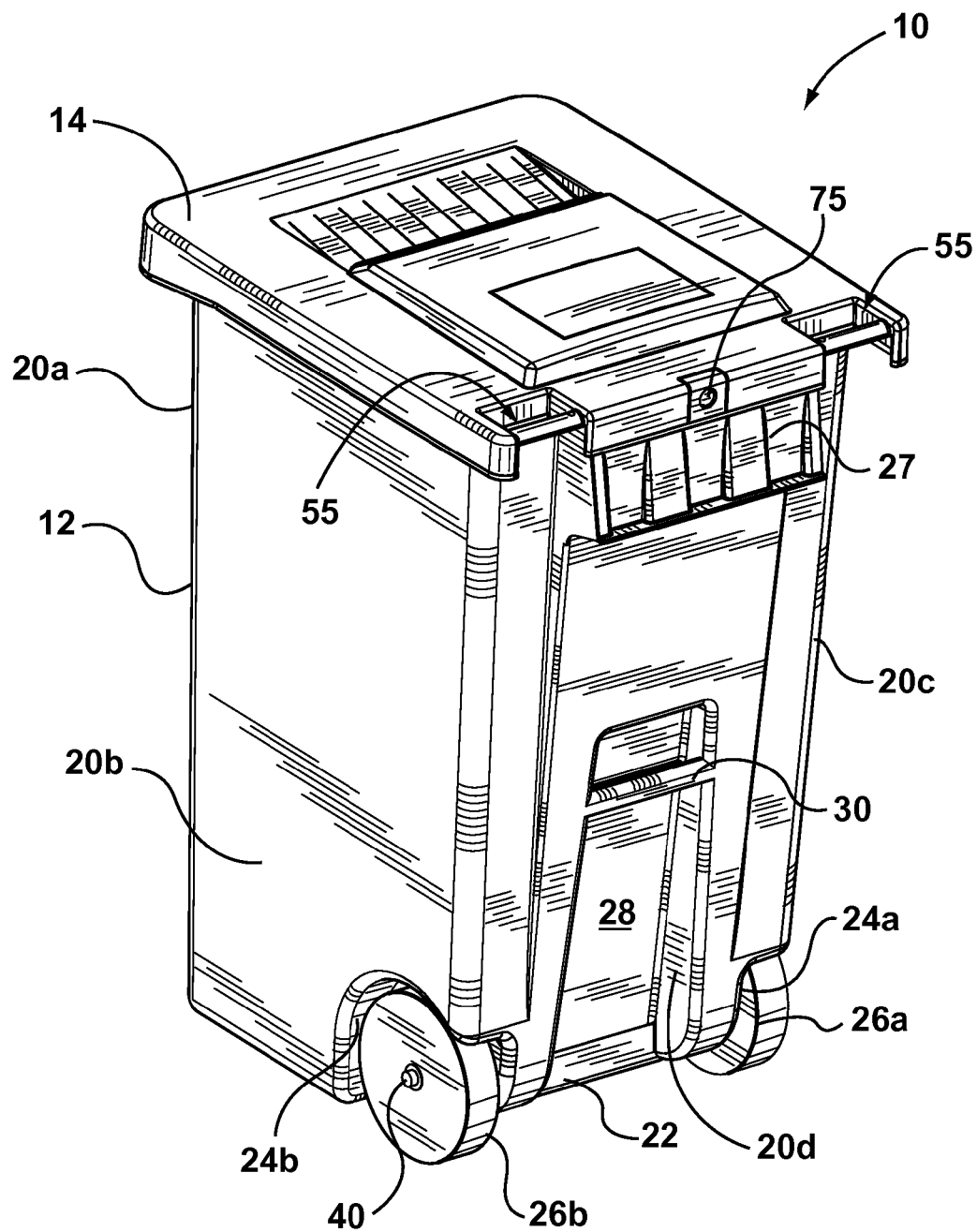
FIG. 1 is a perspective view of a bin exemplary of an embodiment of the present invention.

FIG. 1 is a perspective view of an accumulation/disposal bin 10 exemplary of an embodiment of the present invention.

FIGS. 2, 3A-3C and 4 are front, rear and side views of bin 10. As will become apparent, bin 10 is suitable for collecting documents in a substantially tamper-proof manner. Specifically, bin 10 may be particularly well suited for collecting paper prior to its secure disposal by way of shredding, incineration, or the like. Bin 10 is formed of a container body 12, and lid 14.

As illustrated in FIGS. 1, 2, 3A-3C and 4, container body 12 includes four upstanding walls: a front wall 20a, a rear wall 20d, and two sidewalls 20b and 20c. These extend upward from and at a slight angle to base 22 (e.g. at an angle of between 2-12° between the planes of base 22 and the plane of each of walls 20a, 20b, 20c and 20d).

Two wheel wells 24a, 24b for receiving wheels 26a, 26b making bin 10 generally movable, are formed at rear bottom of bin 10, proximate the intersection of side and rear walls at base 22. In the depicted embodiment, wheel wells 24a and 24b are formed predominantly in side walls 20b and 20c of container body 12. Each wheel well 24a and 24b is generally disk shaped, having a diameter and height sized to accommodate a complementary wheel 26a/26b. Wheels 26a, 26b may be conventional, formed of rubber, plastic or other suitable material. They may be hollow or solid.

Container body 12 further includes a lifting skirt 27 and a bottom lift slot 28, formed on rear wall 20d. Slot 28 and skirt 27 may be engaged by a complimentary lift extending from a trolley, mechanical mover, or the like.

Handles 55 are formed at the top rear of bin 10, and allow bin 10 to be pulled or pushed. Conveniently, handles 55 may be used to pull bin 10 on wheels 26a, 26b as bin 10 is tilted rearward. A hinge 25 for pivoting lid 14 between open and closed positions is formed on the front of bin 10, generally opposite handles 55.

Lifting slot 28 is formed as a generally rectangular indentation on rear wall 20d, extending upward from the bottom of rear wall 20d. As illustrated, lift slot 28 is laterally centered on rear wall 20d, and has a width of about ⅓ of rear wall 20d. Lifting slot 28 tapers slights as it extends upwardly. Lifting slot 28 further includes a laterally extending bar 30 located about ⅘ of the way upwardly along slot 28. A gap is formed behind bar 30 and slot 28, as shown in the enlarged view of FIG. 3B. Skirt 27, slot 28 and bar 30 are suitable for engaging the mechanical lift. Lifting slot 28 may for example be formed in compliance with ANSI Standard Z245.60-2006, the contents of which are hereby incorporated by reference.

A lock 75 may secure lid 14 to bin 12, as detailed below.

Figure 5A:
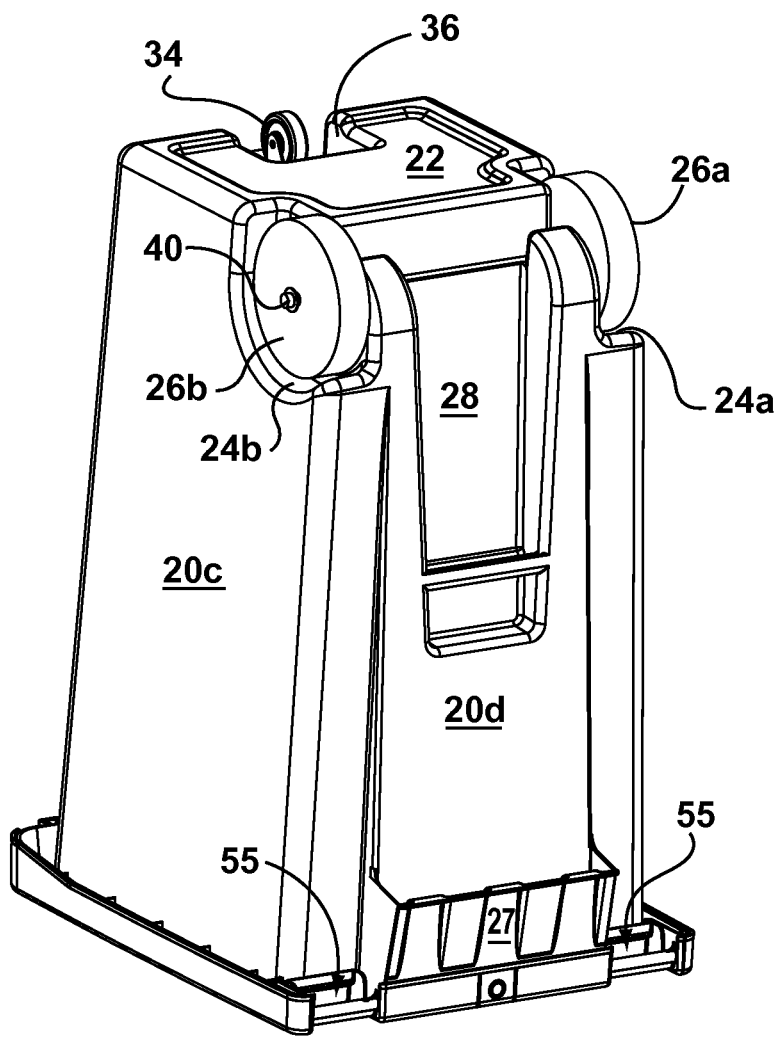
FIGS. 5A and 5B are perspective views of the bin of FIG. 1 in an inverted position.
Figure 5B:
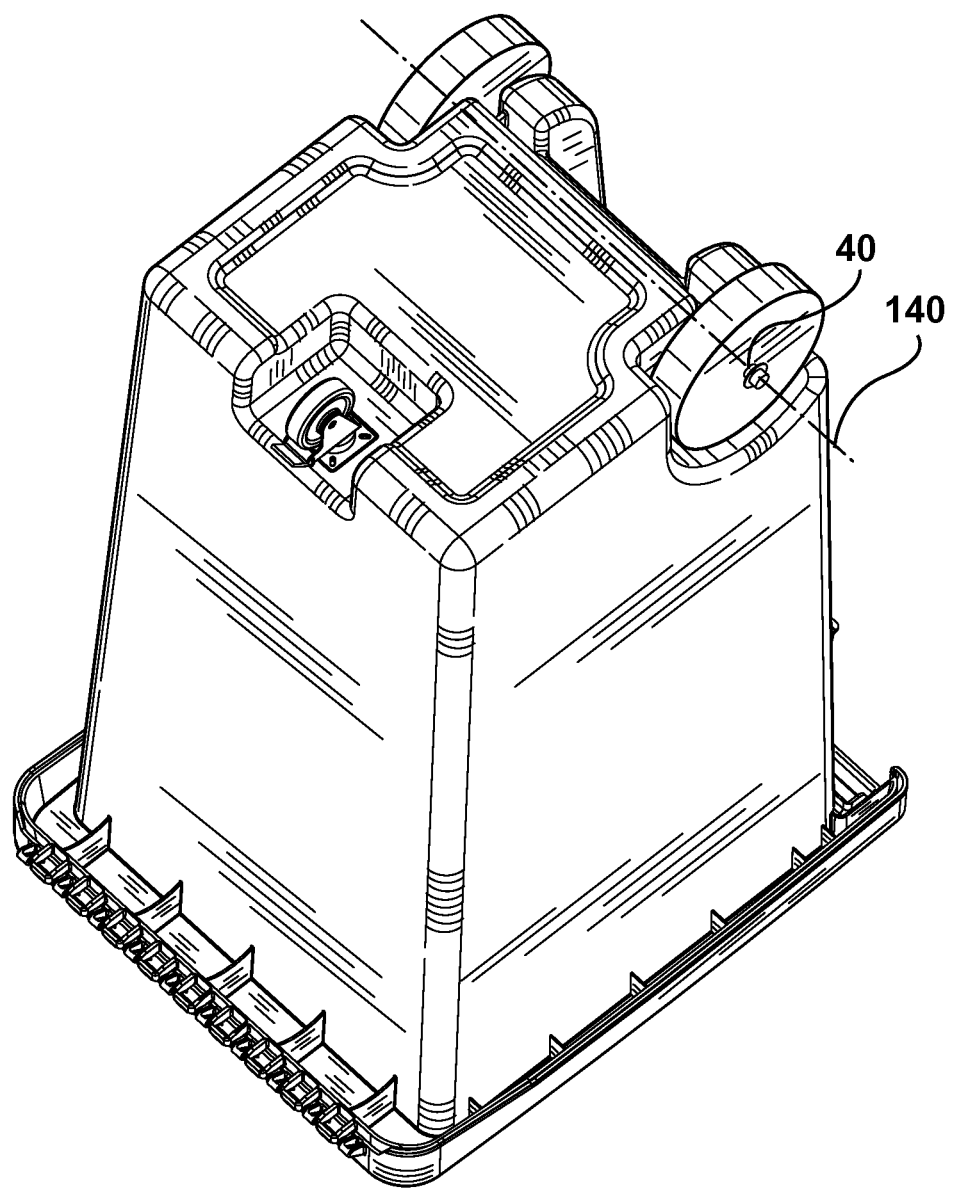
Figure 5C:
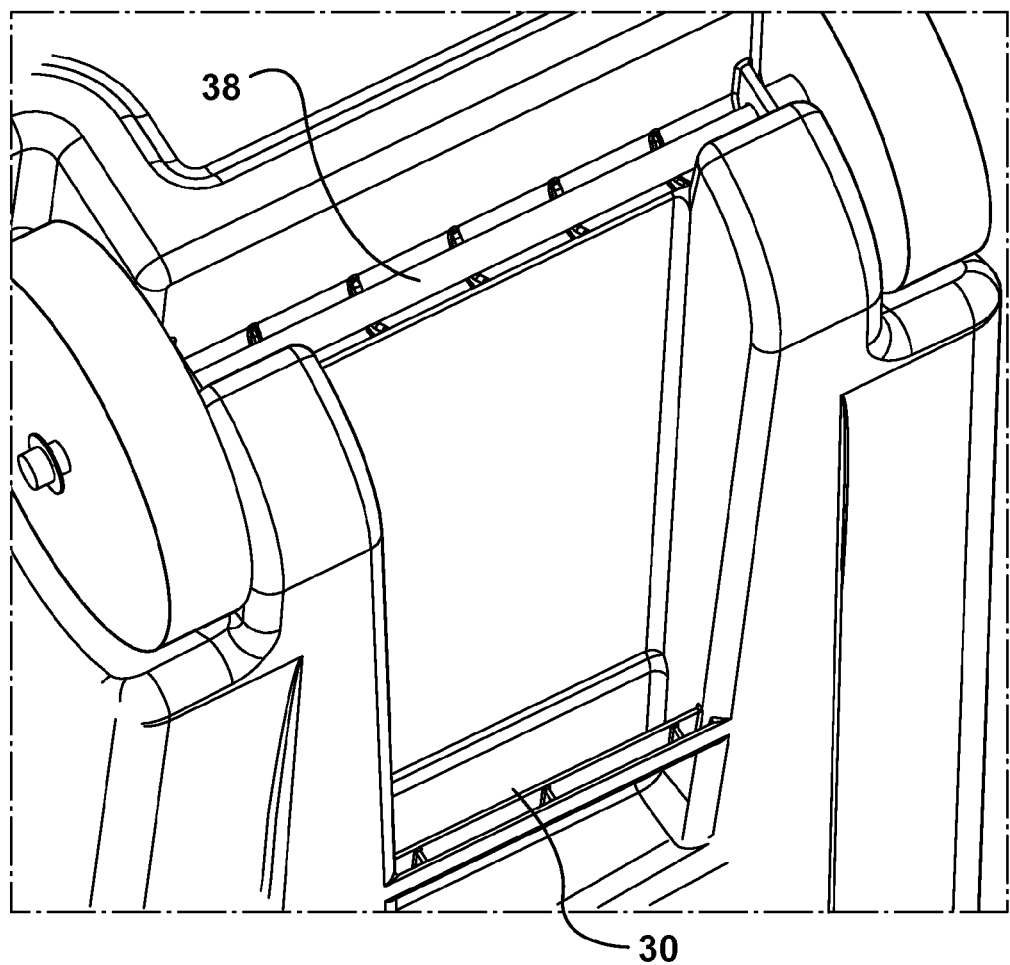
FIG. 5C is an enlarged view of a portion of FIG. 5A.

The bottom of bin 10 is more particularly illustrated in FIGS. 5A, 5B and 5C. As illustrated, bin 10 includes three wheels. Two generally opposed disc shaped wheels 26a, 26b are seated in wheel wells 24a, 24b, at the rear bottom corners of bin 10, proximate the intersection of base 22, and rear wall 20d and side walls 20b, 20c. Wheels 26a, 26b are axially mounted on an axle 40 that extends substantially from side to side of bin 10. Wheels 26a, 26b may thus rotate about an axis 140 that is generally fixed relative to container 12, and lies in a horizontal plane. Wheel wells 24a, 24b are connected by a hollow tunnel 38 that may accommodate an axle 40 on which wheels 24a, 24b are mounted. Hollow tunnel 38 may be continuous, or formed of several segments. Conveniently, hollow tunnel 38 extending between wheel wells 24a, 24b allows for free rotation of the axle 40 therein.

A third wheel (visible in FIGS. 2, 3A, 4, 5A and 5B) is formed as a caster 32. Caster 32 includes a wheel 34, smaller than wheels 26a, 26b that rotates about an axis that itself may rotate about a vertically extending axis, relative to container body 12. Caster 32 is mounted in a recess 36 formed in base 22, generally midway between side walls 20b and 20c. Recess 36 extends vertically, and is sufficiently deep so that wheel 34 and wheels 26a, 26b allow bin 10 to rest level on a level surface (i.e. so that wheels 26a, 26b, 34 are tangent to a common horizontal plane). The three wheels 26a, 26b, and 34 allow flexible manoeuvring of bin 10, when empty or full. However, when bin 10 is tilted backward substantially all of the weight of bin 10 is borne by wheels 26a, 26b.

Figure 6A:
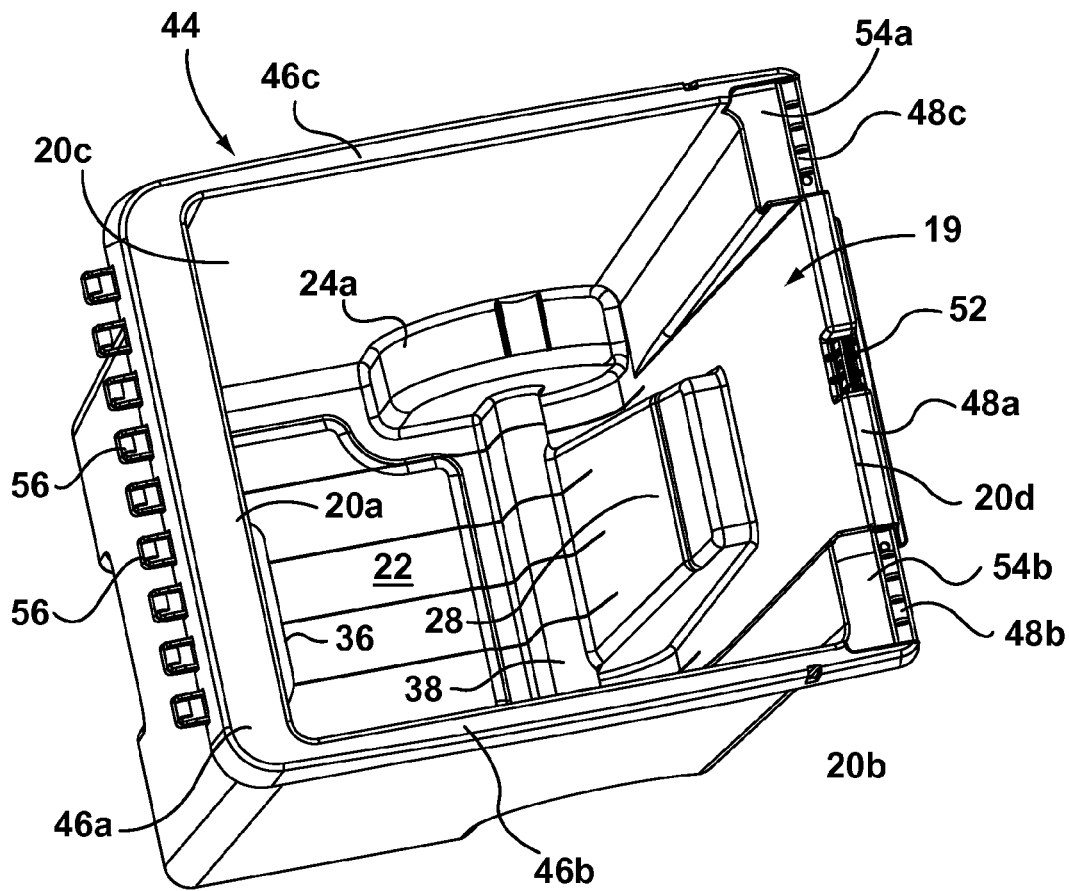
FIG. 6A is a top view of the bin of FIG. 1 with lid removed.
Figure 6B:
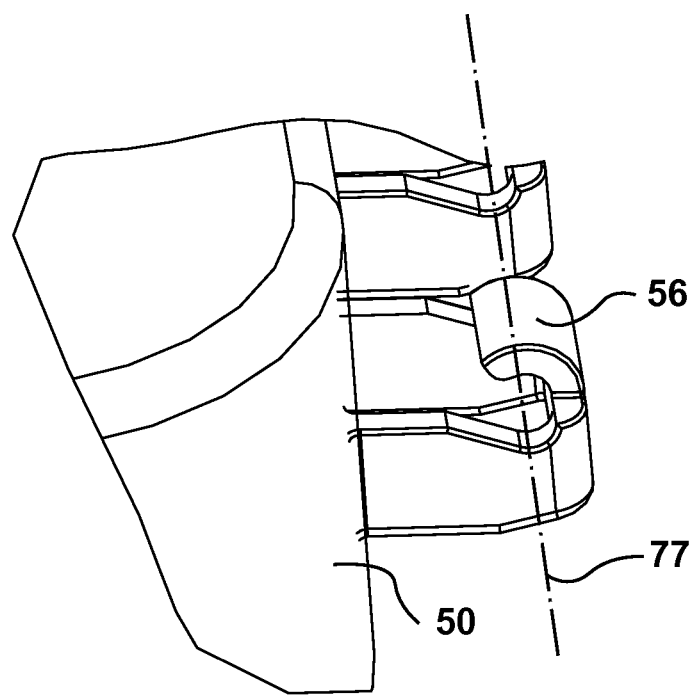
FIG. 6B is an enlarged view of a portion of FIG. 6A.

The interior of container body 12 may be better appreciated with reference to FIGS. 6A and 6B. As illustrated, the upper edge of each of walls 20a, 20b, 20c and 20d define an opening 19 into container body 12. The two generally disc-shaped wheel wells 24a, 24b extend into the interior of container body 12. Similarly, recess 36 extends into the interior of container body 12. Likewise, walls forming lift slot 28 also extend inwardly into container body 12.

A rim 44 extends around the upper periphery of container 12 as illustrated in FIG. 6A. Rim 44 is actually a combination of front, rear and side rim portions 46a, 46d, 46b and 46c. Front and side rim portions 46a, 46b and 46c are generally uniform, and continuous. Each of front and side rim portions 46a, 46b and 46c terminates in a downwardly extending skirt 50.

Rear rim portion 46d has three segments: a center segment 48a is generally flat and extends outwardly from the edge of the top opening of container 12. Center segment 48a includes a lock opening 52. Left and right rear rim segments 48b and 48c, extend from center segment 48a to rim portions 46b and 46c, respectively, and are formed as concave half cylinders. Left and right rear segments 48b, 48c each define an opening 54a, 54b between the top edge of rear wall 20d, and left and right rear rim segments 48b, 48c.

Further, a plurality of generally hooked shaped hinge portions 56 (also shown in enlarged view in FIG. 6B) extend generally outward from skirt 50 of front rim portion 46a. Hooked shaped hinge portions 56 are generally uniformly spaced, and are suitable for receiving and retaining a hinge pin, that may pivot in hinge portions 56, to form hinge 55.

Container body 12 (excluding wheels 26a, 26b and accompanying axle 40 and caster 32) may be integrally formed, using a suitable injection mould. A suitable plastic appreciated by those of ordinary skill, such as poly-ethylene or the like, may be used to form container body 12, with walls 20a, 20b, 20c and 20d, base 22, as well as rim 44, and skirt 50 having thicknesses of between 2 and 8 mm, or greater. Conveniently, an appropriate choice of thickness may make bin 10 suitable from holding 130 kg or more of refuse/paper, without placing undue stress on bin 10.

Lid 14 is more particularly illustrated in FIGS. 7, 8A to 8C and 9. As illustrated, lid 14 is complementary in size to the upper opening 19 (FIG. 6A) to container body 12 and includes a generally planar portion 60, surrounded by a skirt 62 extending downwardly from the front and side edges of planar portion 60 of lid 14. Skirt 62 includes contiguous front and side skirt portions 64a, 64b and 64c. A rear skirt portion 64d may further be divided into three skirt portions 66a, 66b and 66c. Center skirt segment 66a extends along the rear edge of lid 14, on each side of the middle of the rear edge of lid 14. Right and left skirt portions 66b and 66c are set back from center skirt portion 66a. Semi-cylindrical handle portions 70a and 70b extend beside skirt portion 66a, generally flush therewith.

Lock 75 includes a pin 72 that extends toward the center of lid 14. Pin 72 may be retracted by a key (not shown) that may be inserted and removed in a key hole on the side of lock 75, opposite of pin 72, and exterior to lid 14. Suitable locks may be available from Hettich International of Germany, under part number 356300. Pin 72 is aligned with lock opening 52 of rear rim portion 46d. Lock opening 52 lies in a vertical plane, pin 72 extends into and out of lock opening 52. As such, lid 14 may be locked to cover opening 19, using a key to extend and retract pin 72.

Formed on front skirt portion 64a of lid 14 is a hinge portion 74, including a plurality of laterally extending hinge pins 76, complementary to the hooked hinge portions 56 (FIGS. 6A, 6B) extending forwardly from bin 10. Pins 76 are co-axial, arranged about a pivot axis 77 that is in a generally horizontal plane. In this way, lid 14 may be pivotally mounted on container body 12 on hinge 25 defined by hinge portions 56 and 74, as for example illustrated in FIG. 10. Conveniently, lid 14 pivots about the pivot axis 77 on hinge 25 located at the front of bin 10. As illustrated, lid 14 pivots toward and away from the front of bin 10, through an angle of about 260°, about axis 77, proximate front wall 20a. Of course pins 76 could be replaced by a single pin that engages multiple hooked hinge portions 56.

Now, when lid 14 is atop container 12, as illustrated in FIGS. 1, 2, 3A-3C, 4 front and side skirts portions 64a, 64b and 64c of lid 14 engage the periphery of opening 19 (FIG. 6A). Specifically skirts portions 64a, 64b and 64c engage complementary front and side of skirt 50 of rim 44. Pin 72 of lock 75 is received in locking opening 52. Semi-cylindrical portions 70a, 70b of lid 14 and semi-cylindrical skirt portions 64b and 64c of rim 44 form generally cylindrical grips that may be used to move bin 10.

Accordingly, handles 55 are formed by overlapping portions of lid 14 and container body 12. Handles 55, have an opening (defined by overlapping opening 54a, 54b and opening 65a, 65b) next to a grip 55, on the rear side of opening 19 to container body 12. Handles 55 are on one side of opening 19, while hinge 25 is on the opposite side.

Figure 2:
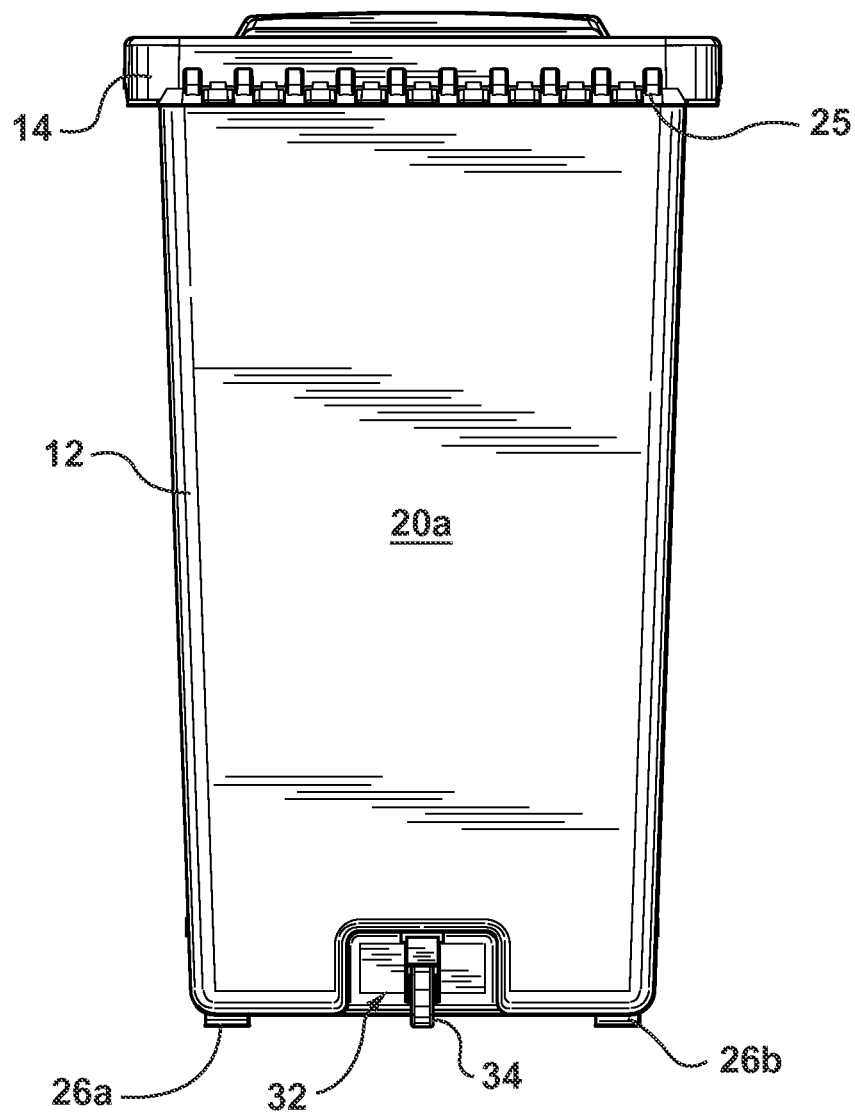
FIG. 2 is a front view of the bin FIG. 1.
Figure 3A:
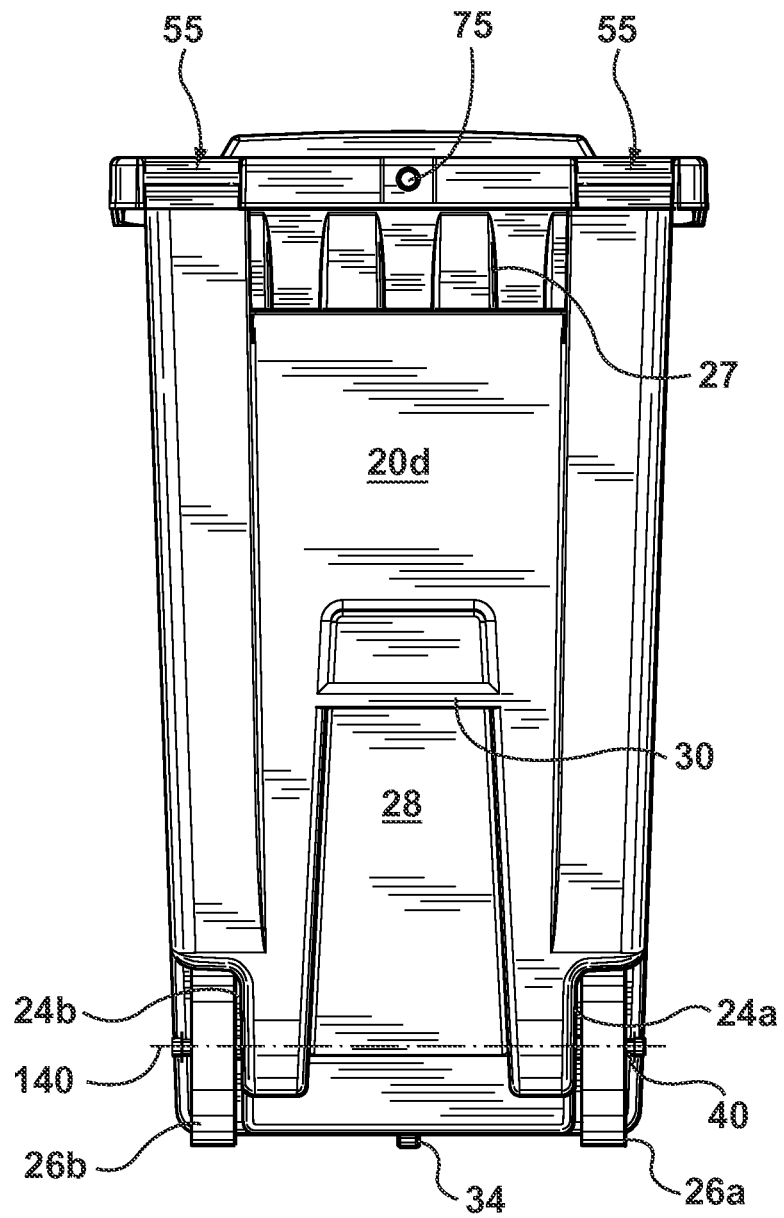
FIG. 3A is a rear view of the bin of FIG. 1.
Figure 3B:
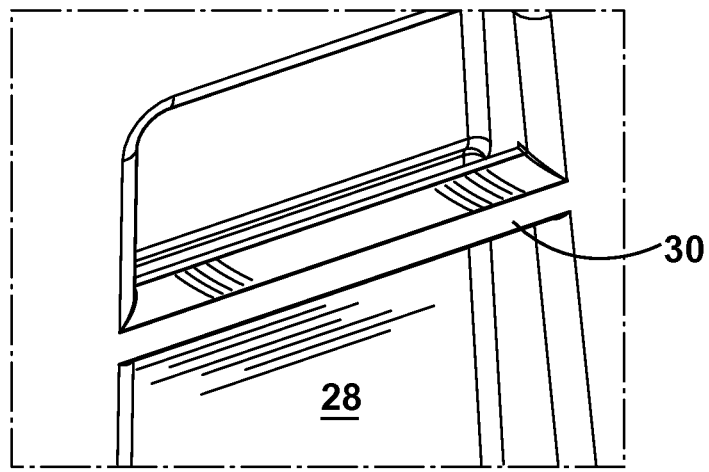
FIGS. 3B-3C are enlarged views of portions of FIG. 3A.
Figure 3C:
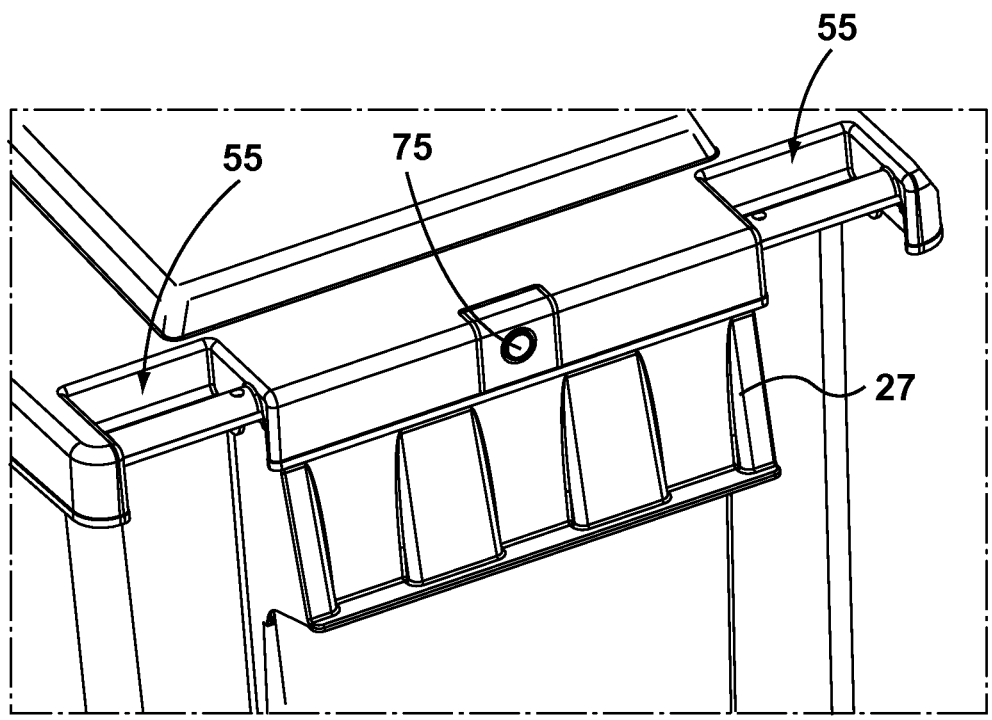
Figure 4:
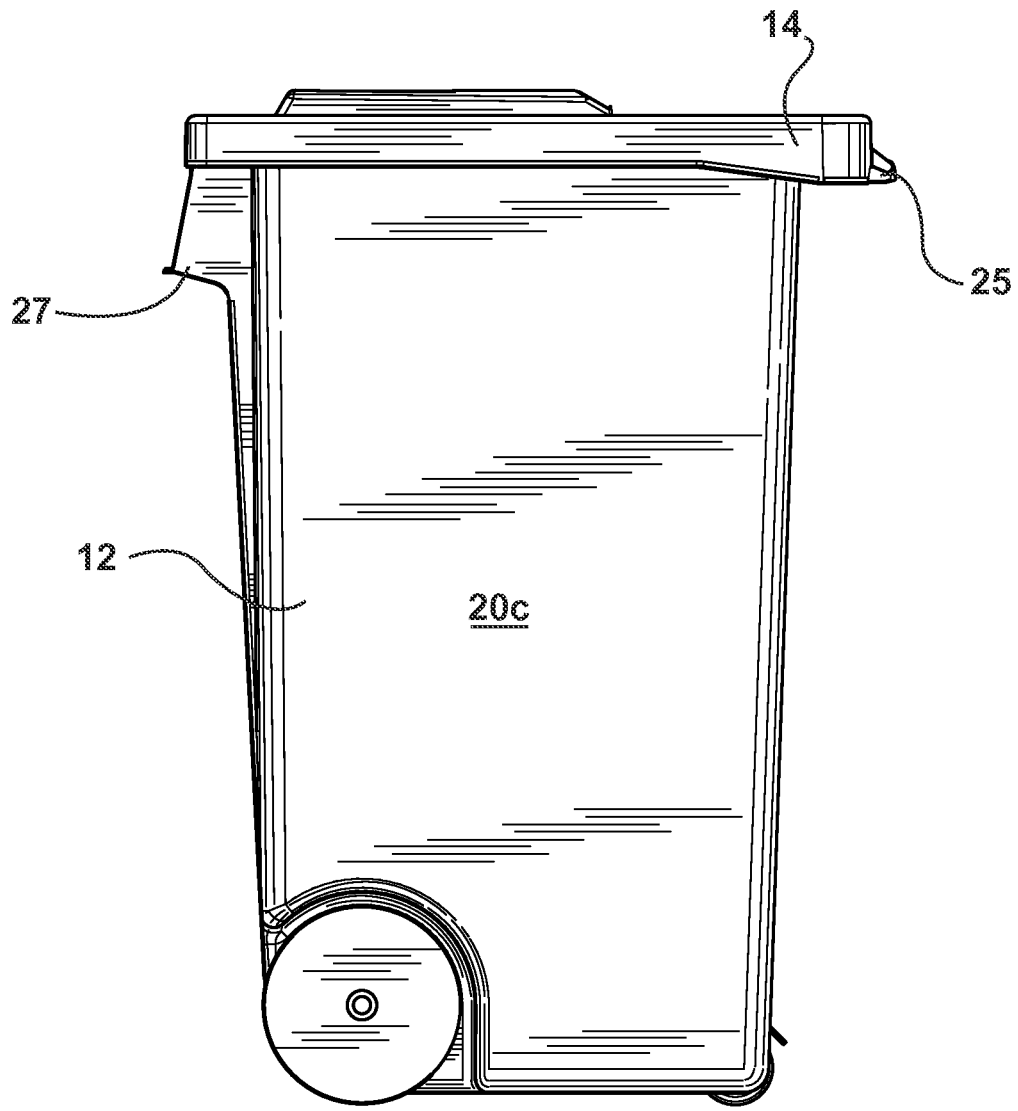
FIG. 4 is a right side view of the bin of FIG. 1.

Conveniently, hinge 25 is mounted on the front wall 20a of bin 10. As such, wheels 26a, 26b, lock 75, skirt 27, and lifting slot 28 are on the same rear side of bin 10, and are obstructed from view, when bin 10 is viewed from the front (as best seen in FIG. 2). This provides for a relatively clean front aesthetic. Moreover, tampering with lock 75 of bin 10 requires access to the rear of bin 10, which is typically inaccessible as it is often proximate or in abutment with a wall at the place of installation.

Figure 7:
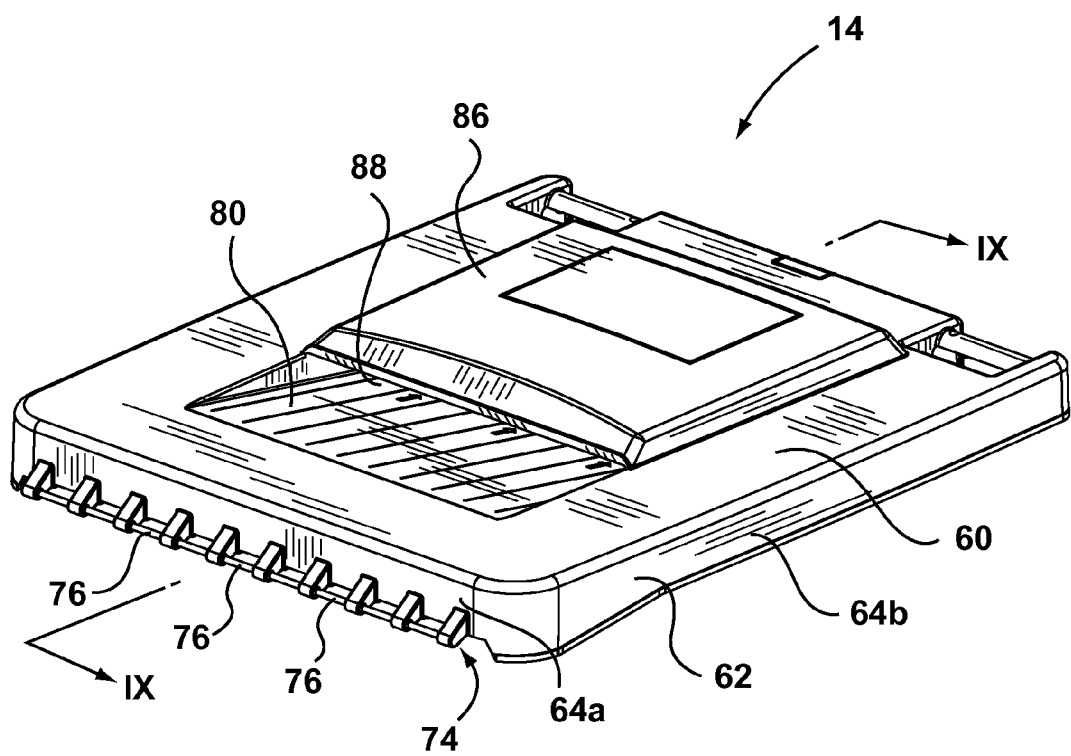
FIG. 7 is a perspective view of a lid of the bin of FIG. 1.
Figure 8A:
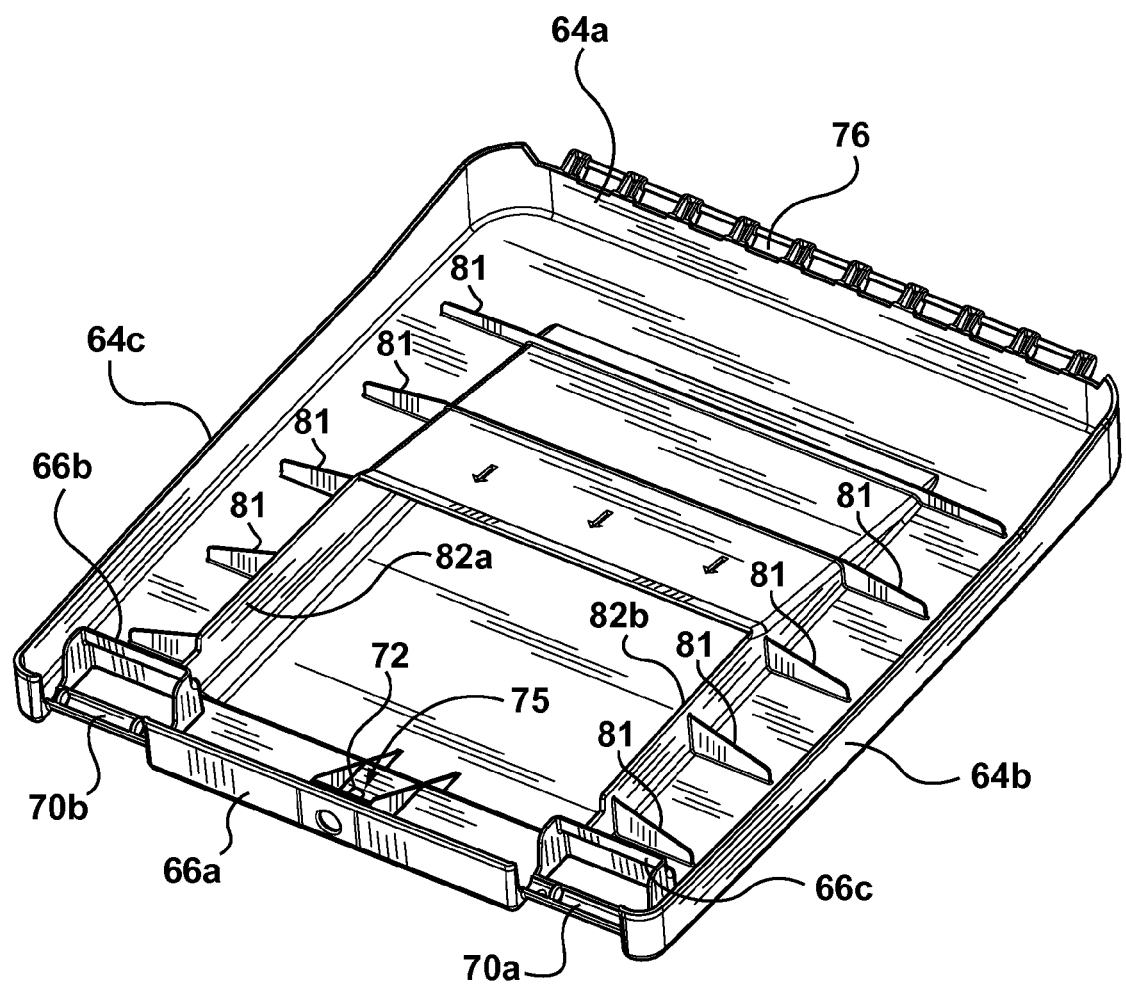
FIG. 8A is a perspective view of the lid of FIG. 7 in an inverted position.
Figure 8B:
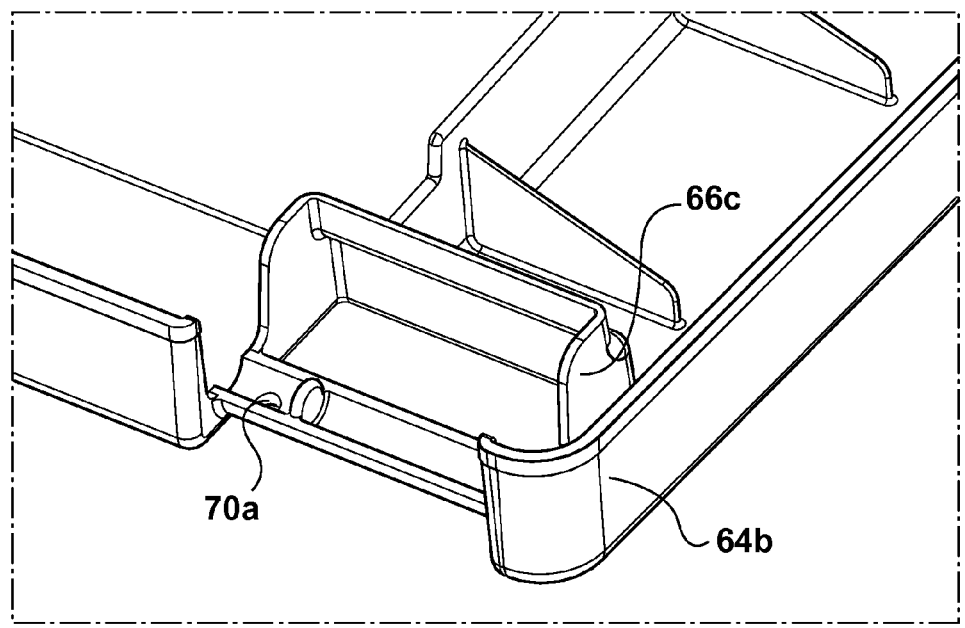
FIGS. 8B-8C are enlarged views of portions of FIG. 8A.
Figure 8C:
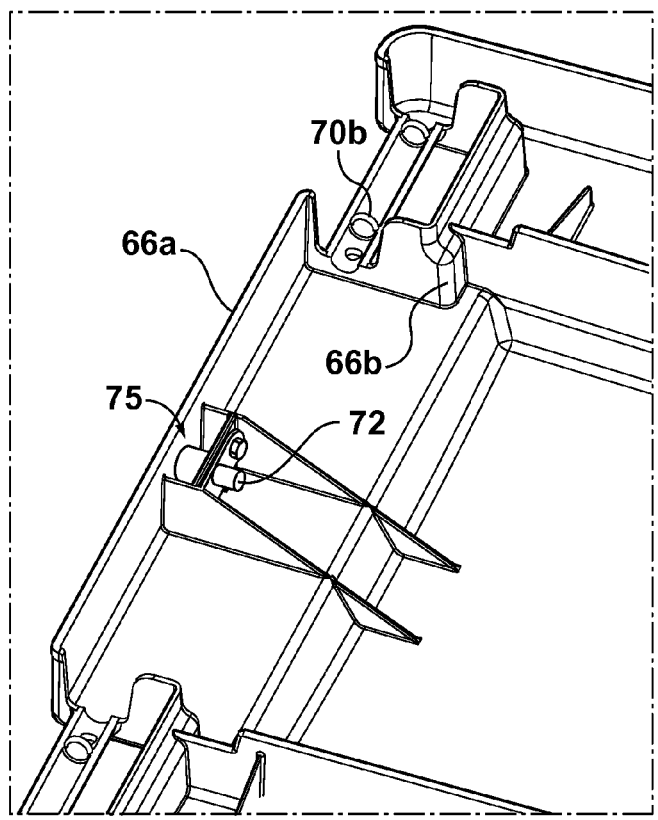
Figure 9:
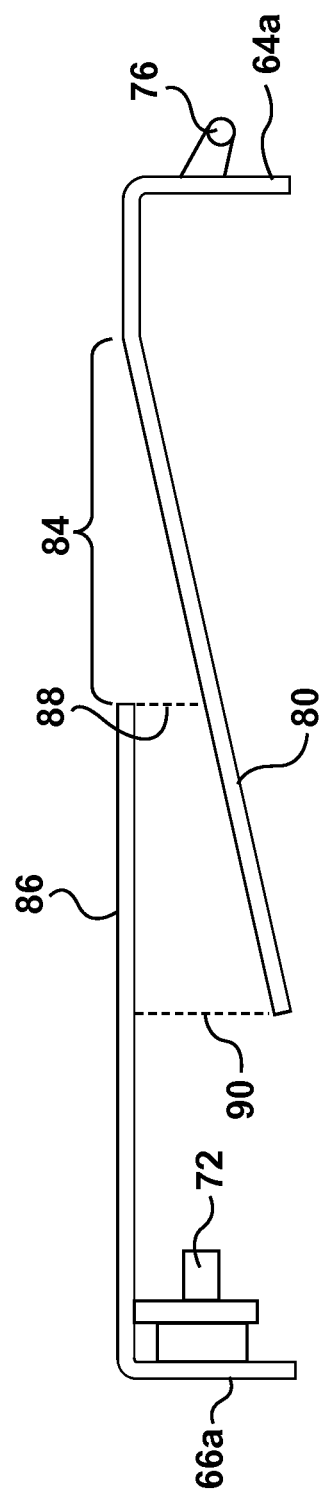
FIG. 9 is a cross-sectional view of the lid of FIG. 7, along line IX-IX.

As shown in FIGS. 7, 8A and 9, lid 14 further includes a ramp 80 extending downwardly into the interior of container 12, supported by ramp side walls 82a and 82b. Ramp 80 extends from region 84 in a generally horizontal plane. In the absence of ramp 80, region 84 would define an opening in a horizontal plane into container body 12. Ramp 80 extends between a generally flat planar portion 86 above ramp 80. As best viewed in FIG. 9, planar portion 86 and ramp 80 thus define a first slot 88 in a generally vertical plane. Ramp 80 terminates at a second slot 90. Slot 90 is also generally vertical. Slots 88 and 90 have sufficiently small heights and ramp 80 extends a sufficient distance between slot 88 and slot 90 so that access to slot 90 from slot 88, using the human hand is difficult, if not impossible. Optionally, side walls 82a and 82b, may extend beyond ramp 80, further along the interior of lid 14, to more precisely define a guide slot extending from slot 90. Reinforcing ribs 81 that reinforce lid 14 may extend transverse to ramp 80 and walls 82a and 82b. Slots 88 and 90 may, for example, be spaced by 50-150 mm (e.g. 100 mm). The angle and spacing of ramp 80 is such that slots 88 and 90 have a height that may, for example, be between 2 mm and 25 mm (slot 88 may for example be 2.5 mm, and slot 90 6.5 mm). As illustrated, generally planar portion 86 is slightly above the remaining part of generally planar portion of lid 14. Generally planar portion 86 need not be planar, but could be curved or domed, or have another shape provided that portion 86 covers a portion of the horizontal plane above ramp 80 to define slots 88 and 90. Slots 88 and 90, of course need not have a uniform height, and will typically not be have the same dimensions.

Conveniently ramp 80 and slots 88 and 90 may be formed wide enough to accept standard size paper to be collected in bin 10. As such the width of slots 88 and 90 may typically be in excess of 8.5", and may for example have a width of between 8.5" and 12", or larger.

In use, bin 10 is typically placed in a location where refuse, and particularly paper is to be collected. Typically, bin 10 is placed in an office environment. Wheels 26a, 26b and 34 allow bin 10 to be pushed into place. Preferably, rear wall 20d is pushed into close proximity or even abutment with a wall making access to lock 75 difficult.

Once in place, end users place paper for disposal into bin 10, by sliding the paper on ramp 80 from slot 88 to slot 90, and into the interior of container body 12. The distance between slot 88 and slot 90, and the height of slots 88 and 90, allows the insertion of paper into bin 10, but prevents its easy removal, by hand or simple instrument. The downward tilt of ramp 80 facilitates the sliding insertion of paper into bin 10. Depending on the height of slots 88 and 90 many stacked sheets may be concurrently passed through slots 88 and 90.

Once bin 10 is substantially full, bin 10 may be wheeled away for emptying. Specifically, bin 10 may be tilted so that its only point of contact to the ground is wheels 26a, 26b that act as load bearing wheels. So tilted, bin 10 may be pulled by handles 55 and wheeled to an exit or elevator and transported to transport apparatus that engages slot 28, bar 30 and skirt 27. Prior to emptying bin 10, the lock may be opened. Bin 10 may be tilted backward, and ultimately turned upside down. As bin 10 is tilted, lid 14 pivots open about hinge pins 76, with the rear edge of lid 14 swinging toward the front of bin 10.

Conveniently, as handles 55 are formed apart from hinge 25, handles 55 and wheels 26a and 26b, as well as lift slot 28 and lift skirt 27 may be formed at the rear of bin 10, while hinge 55 is formed at the front of bin 10. Thus, as best viewed in FIGS. 2 and 3, lift slot 28, wheels 26a and 26b, skirt 27, and lock 75 may be generally hidden from view.

Figure 10:
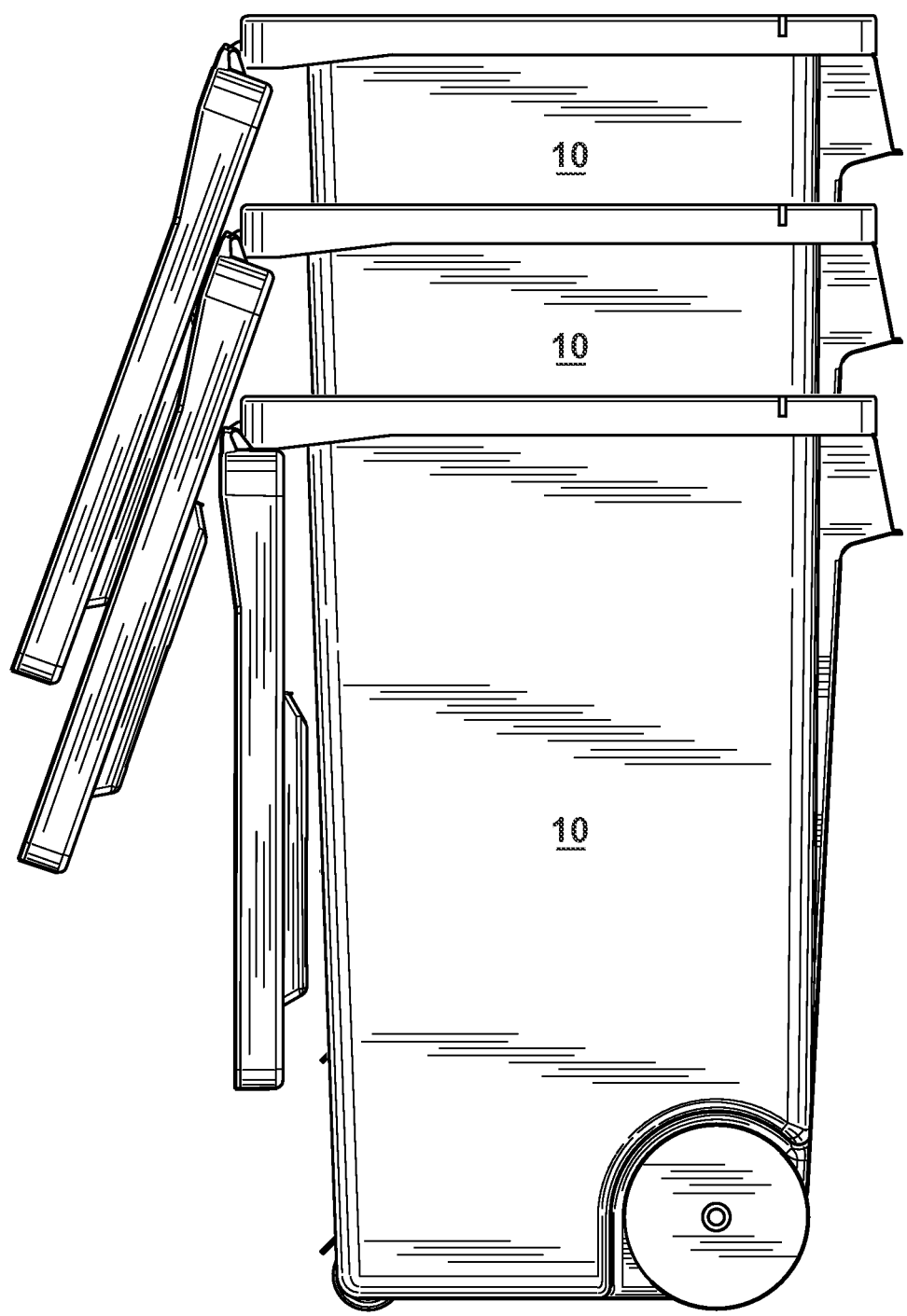
FIG. 10 is a perspective view of multiple bins of FIG. 1, stacked.
Figure 11:
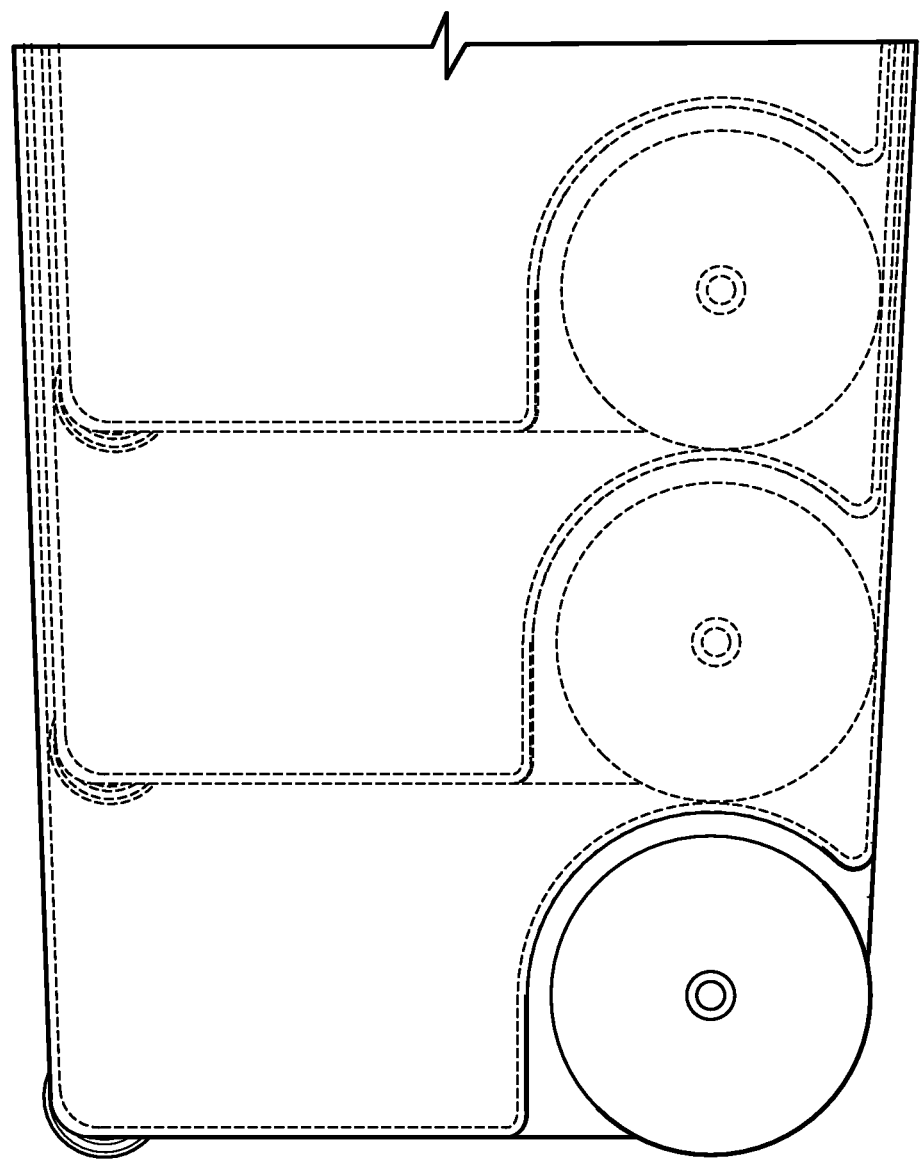
FIG. 11 is a schematic illustration of the multiple bins of FIG. 9.

When not in use, several bins of the form of bin 10 may be stacked or nested, as illustrated in FIG. 10. As illustrated, the outer surface of body 12 of one bin 10 is received within the interior of body 12 of a bin directly beneath the received bin. Conveniently, the top of wheel wells 24a and 24b in the interior of container body 12 provide a support for wheels 26a, 26b of a received bin. This is schematically illustrated in FIG. 11.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A bin for holding paper, said bin comprising a container body defining an opening, a generally planar lid closing said opening formed as a unitary body from injection molded plastic, said lid comprising a downwardly sloped ramp for supporting paper to be inserted into said bin, said sloped ramp extending from an opening in a horizontal plane to beneath a portion of said lid at least partially covering said sloped ramp, said sloped ramp and said portion of said lid defining first and second openings each in a generally vertical plane, said second opening providing an entrance to an interior of said container body, said ramp defining a continuous support surface that supports a stack of letter sized paper, and is configured to allow said stack to be slid on said ramp through said first and second openings along a continuous linear path, and to allow said stack to be urged along said ramp into said interior without being bent, and wherein said first and second openings of said slot are spaced to prevent insertion of a hand into said container body to remove paper inserted through said slot, and wherein said lid further comprises sidewalls along edges of said sloped ramp and reinforcing ribs extending from said sidewalls, to prevent said first and second opening from being vertically enlarged, wherein a height of the first opening defines the maximum height of said stack that may be slid on said ramp without bending, and wherein the maximum height of said stack that may be slid is substantially equal to said height of said first opening.

2. The bin of claim 1, wherein said first and second openings are spaced by at least 50 mm.

3. The bin of claim 1, wherein said first and second openings are spaced by at least 100 mm.

4. The bin of claim 1, wherein said lid comprises a skirt extending downwardly along at least one edge of said lid, for engaging said container body.

5. The bin of claim 1, further comprising a hinge formed at the front of said bin, for pivotally mounting said lid to said container body.

6. The bin of claim 5, wherein said ramp is sloped downwardly away from said front of said bin.

7. The bin of claim 1, wherein said portion of said lid at least partially covering said horizontal plane is generally flat.

8. The bin of claim 1, wherein said portion of said lid at least partially covering said horizontal plane is generally dome shaped.

9. The bin of claim 1, further comprising a handle formed at the back of said bin.

10. The bin of claim 9, further comprising two load bearing wheels mounted for rotation about an axis that is fixed relative to said bin, proximate the back bottom of said bin.

11. The bin of claim 10, further comprising a slot for lifting said bin, formed on the back of said bin.

12. The bin of claim 11 further comprising a lock for locking said lid to said body.

13. A bin comprising:
an injection molded container body having upstanding front, rear and side walls extending from a base, said walls defining an upper opening to a container, wherein said front and rear walls oppose each other;
an injection molded lid covering said upper opening;
a lifting mechanism on said rear wall, allowing said bin to be lifted and turned upside down for emptying;
a hinge on said front wall, proximate said upper opening, mounting said lid to said container body to pivot about an axis proximate said front wall of said container body;
a lock on said rear wall for locking said lid to said body;
two opposing wheels, mounted for rotation about an axis that is fixed relative to said body, proximate the rear bottom of the container,
a handle extending on said rear side of said bin proximate said upper opening, said handle comprising a grip for gripping said handle, and for tilting said bin allowing said bin to be pulled on said two opposing wheels with its entire weight supported by said two opposing wheels and said handle,
wherein said handle is formed by overlapping portions of said lid and said body, that prevent opening of said lid as said grip is gripped and said bin is tilted.

14. The bin of claim 13, wherein said lid comprises a downwardly extending skirt for engaging the periphery of said upper opening.

15. The bin of claim 13, wherein said lifting mechanism comprises a slot for lifting said bin on said rear wall.

16. The bin of claim 15 wherein said handle is formed proximate said upper opening on the rear of said bin.

17. The bin of claim 13, further comprising two wheel wells each formed proximate the intersection of said base, and said rear and side walls, in which said opposing wheels are mounted.

18. The bin of claim 13, wherein said lifting mechanism comprises a lifting skirt, extending outwardly from said rear wall.

19. The bin of claim 15, wherein said rear wall comprises an indentation extending from said base, and defining a lifting slot.

20. The bin of claim 16, further comprising a laterally extending bar extending across said lifting slot.

21. The bin of claim 13, further comprising a caster mounted on said base.

22. The bin of claim 13, wherein said lid comprises a generally planar panel, and a downwardly sloped ramp for supporting paper to be inserted into said bin, said ramp extending from an opening in a horizontal plane toward said rear wall to beneath a portion of said generally planar panel partially covering said ramp, said ramp and said portion of said lid defining first and second slots each in a generally vertical plane, said second slot providing an entrance to an interior of said container, said ramp and said first and second slots providing a linear path allowing paper to be urged along said ramp into said bin without being bent.

23. The bin of claim 1, wherein said height of said first opening is at least 20 mm.

24. A bin comprising:
a container body having upstanding front, rear and side walls extending from a base, said walls defining an upper opening to a container, wherein said front and rear walls oppose each other;
a lid covering said upper opening;
a lifting mechanism on said rear wall, allowing said bin to be lifted and turned upside down for emptying;
a hinge on said front wall, proximate said upper opening, mounting said lid to said container body to pivot about an axis proximate said front wall of said container body;
two opposing wheels, mounted for rotation about an axis that is fixed relative to said body, proximate the rear bottom of the container;
a handle extending on said rear side of said bin proximate said upper opening, said handle comprising a grip for gripping said handle, and for tilting said bin allowing said bin to be pulled on said two opposing wheels with its entire weight supported by said two opposing wheels and said handle,
wherein said handle is formed by overlapping portions of said lid and said body, that prevent opening of said lid as said grip is gripped and said bin is tilted.

* * * * *